United States Patent Office 3,530,092
Patented Sept. 22, 1970

3,530,092
PROCESS FOR PREPARING ORGANOSILICON-NITROGEN COMPOUNDS
Robert Curtis Borchert, Tonawanda, N.Y., assignor to Union Carbide Corporation, a corporation of New York
No Drawing. Filed July 26, 1968, Ser. No. 747,833
Int. Cl. C08f 11/04
U.S. Cl. 260—46.5                          7 Claims

ABSTRACT OF THE DISCLOSURE

Process for preparing a siloxamine polymer containing at least one amino radical directly bonded to silicon which comprises reacting a hydrosilicon modified silicone polymer with an amine compound in the presence of a catalytic amount of a platinum catalyst.

The organosilicon-nitrogen compounds prepared by this process are used to treat paper, textile, leather, etc., to impart water-repellancy and help reduce shrinkage characteristics and can also be used to water-proof metals, glass and ceramics.

BACKGROUND OF THE INVENTION

This invention relates to a process for producing organosilicon-nitrogen compounds. More particularly, this invention relates to a process for preparing silox-amine polymers by reacting a hydrosilicon modified silicone polymer with an amine compound in the presence of a platinum catalyst.

Heretofore organosilicon-nitrogen compounds have for the most part been produced by reacting a halosilicone compound with an amine compound. This general reaction is well known and may be illustrated by the following skeletal equation:

$$\equiv Si-Cl + 2 = NH \longrightarrow \equiv Si-N + =N \cdot HCl$$

However, this basic process possesses several disadvantages. For instance, two mole equivalents of the nitrogen base are required for each silicon-nitrogen bond formed and although a portion of the base which forms the chloride salt by-product can be recovered, additional time, expense, equipment and process steps are necessary. In addition high yields are difficult to obtain due to the fact that the base chloride salt by-product forms a fine particulate, bulky precipitate that thickens the reaction mass, obstructs filtration and occludes much of the desired product. Moreover, said by-products have small but noticeable solubilities in the desired product and these soluble portions are not readily separable by filtration or centrifuging and traces of the dissolved base chloride can often cause undesirable variations in the subsequent usage of the silicon-nitrogen product. In addition such prior processes have failed to show how selective siloxamine polymers containing amine groups directly linked to pendent silicon atoms (i.e. the interior silicon atoms of the polymer) may be successfully and economically prepared.

SUMMARY OF THE INVENTION

It has now been discovered that organosilicon-nitrogen compounds can be prepared without encountering the above problems and disadvantages by employing the instant novel process which comprises reacting a hydrosilicon modified silicone polymer with an amine compound in the presence of a platinum catalyst.

Therefore, it is an object of this invention to provide an efficient and economical process for preparing organosilicon-nitrogen compounds. Another object of this invention is to provide a process for preparing organosilicon-nitrogen products which may be recovered in high yields by simple conventional recovery procedures. Other objects and advantages of this invention will become readily apparent from the following description and appended claims.

More specifically, the general reaction of the instant invention is illustrated by the following skeletal equation:

$$\equiv SiH + = NH \xrightarrow{Pt} \equiv Si \cdot N = + H_2$$

wherein $\equiv SiH$ represents a hydrosilicon modified silicone polymer; $=NH$ represents an amine; Pt represents a platinum catalyst; $\equiv Si \cdot N=$ represents the desired silicon-nitrogen product (siloxamine) and $H_2$ represents hydrogen gas which evolves as the by-product.

DESCRIPTION OF THE PREFERRED EMBODIMENTS

The expression hydrosilicon modified silicone polymer as employed herein is used to define organosiloxane polymers free from aliphatic unsaturation and containing at least one silicon-bonded hydrogen atom (Si—H). Thus, the particular hydrosilicon modified silicone polymers that may be employed by this invention are not limited to any particular class or type of polymeric compounds, but are broadly applicable to all classes and types of polymers whether they be cyclic, linear, branched, crosslinked, homopolymers or copolymers, and the like. Such classes and types of hydrosilicon modified silicone polymers as well as their methods of manufacture are well known in the art as seen for example by U.S. Pats. 2,519,881; 2,970,150; 3,159,601; 3,159,662 and 3,280,160 as well as many others too numerous to mention. Accordingly the hydrosilicone polymers may include simple silicone fluids and oils as well as resins gums, gels and cured siloxane elastomers.

Among the hydrosilicone modified silicone polymers that may be employed as the starting materials of the instant invention are hydrosiloxanes composed essentially of siloxy units having the formula (A)

$$H_a Si O_{\frac{4-(a+b)}{2}}^{R_b}$$

wherein R is a monovalent hydrocarbon radical or a substituted monovalent hydrocarbon radical, said hydrocarbon radicals being free from aliphatic unsaturation; wherein $a$ is an integer having a value of from 1 to 3 inclusive, wherein $b$ has a value of from 0 to 2 inclusive and wherein the sum of $(a+b)$ has a value of from 1 to 3 inclusive; as well as hydrosiloxane copolymers containing at least one siloxy unit represented by Formula A above and at least one siloxy unit represented by the formula (B)

$$R_c SiO_{\frac{4-c}{2}}$$

wherein R is the same as defined in Formula A above and wherein $c$ has a value of from 0 to 3 inclusive. Thus, the above hydrosilicon modified siloxane polymers employable as the starting hydrosilicon reactants of this invention must contain at least one siloxy unit, such as $RHSiO$, $R_2HSiO_{0.5}$, $HSiO_{1.5}$, $H_2SiO$, $H_3SiO_{0.5}$ or $RH_2SiO$ and may also contain one or more siloxy units, such as $R_3SiO_{0.5}$, $R_2SiO$, $RSiO_{1.5}$, or $SiO_2$; where R in said siloxy units is the same as defined above. Due to the varying functionality of the siloxy units, the siloxane polymer can be predominately linear or branched or cyclic or crosslinked or it can have combinations of these structures. Said copolymers are composed of from 1 to 99 mole percent of siloxy units represented by Formula A and from 1 to 99 mole percent of siloxy unis unis represened by Formula B. The average molecular weight of said hydrosilicon modified silicone polymers is not critical since the polymer may range from a simple disoloxane up to siloxane polymers having an average molecular weight of as high as two million or higher if desired while its viscosity may range from $10^{-1}$ up to $3 \times 10^9$ centipoises at 25° C.

As noted above, R may be any monovalent hydrocarbon radical preferably containing from 1 to 18 carbon atoms. The radicals represented by R on any given silicon atom may be the same or different, and either aliphatic or aromatic or mixtures thereof. Among the more specific radicals that may be mentioned are, for example, alkyl radicals, such as methyl, ethyl, propyl, butyl, isobutyl, amyl, hexyl, octadecyl and the like; alkylene radicals such as vinyl, allyl and the like; alicyclic radicals, such as cyclopentyl, cyclohexyl and the like; aryl radicals such as phenyl, naphthyl and the like; aralkyl radicals such as benzyl, phenylethyl and the like; and alkaryl radicals such as tolyl, xylyl, mesityl and the like. Moreover, any substituent which does not effect the essential performance of the instant process may be present on said hydrocarbon radicals. Suitable illustrative substituents that may be on the hydrocarbon radicals are, for example, nitro, cyano, trifluoromethyl, secondary amino, fluorine, aryloxy, alkoxy and the like.

More particularly, illustrative hydrosilicone polymer starting materials are those which contain at least one hydrosiloxy unit such as $H_3SiO$, $H_2SiO$, $MeHSiO$, $EtHSiO$, $\emptyset HSiO$, $Et_2HSiO$, $Me_2HSiO$, $MeH_2SiO$, $EtH_2SiO$ and the like and which may also contain one or more organosiloxy units such as $Me_3SiO$, $Et_3SiO$, $Me_2SiO$, $Et_2SiO$, $Me_2EtSiO$, $Me\emptyset SiO$, $MeC_{18}H_{17}SiO$, $(C_8H_{17})_2SiO$, $\emptyset_2SiO$, $Me(\emptyset CH_2)SiO$, $(CH_3\emptyset)MeSiO$, $Me(CH=CH_2)SiO$, $Et(C_6H_{10})SiO$, $Me(C_3H_6CN)SiO$, $Et(CH_2O(CH_2)_{17}CH_3)SiO$, $Me(C_3H_6(OC_2H_4)_7OMe)SiO$, $Me_2(CH_2CHFCHF_2)SiO$, $Me(\emptyset NO_2)SiO$, $Me(C_2H_4O\emptyset)SiO$, $(C_3H_7)_3SiO$, $Et_2(Me)SiO$, $Me(C_2H_4N(C_2H_5)_2)SiO$, and the like, wherein Me represents a methyl radical, wherein Et represents an ethyl radical and wherein $\emptyset$ represents a phenyl radical.

The particular amine compound which can be used to react with the compounds described above containing the silicon-hydrogen linkage is not arrowly critical, since it need only contain at least one reactive hydrogen atom directly bonded to the nitrogen atom. Thus, the amine reactant merely depends on the desired silicon-nitrogen compound to be produced. Such amine reactants as well as their production are well known in the art and include such compounds as aminosilanes, aminosiloxanes, silazanes, hydrazines, ureas, imides, teterocyclic amines, and especially primary and secondary amines which may contain hydrocarbon radicals of from 1 to 18 carbon atoms that may be unsubstituted or substituted with any substituent which does not effect the essential performance of the instant process, such as nitro, cyano, trifluoromethyl, secondary amino, fluorine, alkoxy, aryloxy and the like.

Among the most preferred organic primary or secondary amines that may be employed are those having the structural formula:

wherein $R_1$ represents hydrogen or a monovalent hydrocarbon radical having from 1 to 18 carbon atoms, especially phenyl and lower alkyl radicals; wherein $R_2$ represents a monovalent hydrocarbon radical having from 1 to 18 carbon atoms, especially lower alkyl radicals and if desired N, $R_1$ and $R_2$ taken together may form a heterocyclic ring, such as piperidine, morpholine and the like. Illustrative specific examples of such primary and secondary amines are for example, methylamine, ethylamine, propylamine, isopropylamine, butylamine, t-butylamine, nonylamine, octadecylamine, phenylamine, dimethylamine, diethylamine, dipropylamine, dibutylamine, di-t-butylamine, methylethylamine, methylpropylamine, methylphenylamine, ethylpropylamine, ethylbutylamine, ethylphenylamine, and the like.

As stated above, the instant process involves the use of a platinum catalyst, The term platinum catalyst is used by applicants to define and encompass the metal platinum, supported and unsupported platinum, platinum compounds and platinum complexes. Such catalysts are well known in the art as seen for example by U.S. Pats. Nos. 2,823,218 and 2,851,473 and U.S. application Ser. No. 504,051, filed Oct. 23, 1965, now Pat. 3,410,886. Illustrative of the above mentioned types of catalysts are platinum, platinum-on-alumina; platinum-on-charcoal; chloroplatinic acid, platinum black; platinum-olefin; platinum-cycloalkane; bis(benzonitrile)-dichloroplatinum (II); bis(phenyl-butyronitrile)dichloroplatinum (II); and the like. While obviously only a catalytic amount of platinum catalyst is necessary for the instant reaction, the amount of platinum catalyst may vary over a wide range. Generally about 5 to about 1000 parts by weight per million parts by weight of platinum catalyst is employed based on the weight of the total reactants, while the preferred range is from about 20 to about 500 parts by weight per million parts by weight.

More specifically, the process of the instant invention is conducted by reacting the hydrosilicone polymer containing a SiH linkage with the amine compound containing a NH bond in the presence of a platinum catalyst until the desired amount of number of hydrosilicon (SiH) bonds have been reacted. The hydrogen gas by-product is conveniently vented off and the desired silicon-nitrogen product, normally a liquid, recovered by any suitable conventional method. The order of addition of reactants is immaterial. However, in view of the reactivity of both the starting hydrosilicon modified silcone polymers and the silicon-nitrogen products toward water, alcohols and other hydroxylated substances, it is preferred that the reaction be conducted in a substantially anhydrous and hydroxyl-free environment. While solvent diluents are not needed in the instant process, the use of minor amounts of solvents, such as conventional hydrocarbon solvents, like toluene, xylene, paraffin oil and the like may be employed if desired.

The reaction temperature is not critical and may vary from about 0° C. up to about 300° C. or higher depending on the particular reactants used, the activity of the catalyst and the product desired. Generally, a reaction temperature within the range of from about room temperature to about 275° C. will be sufficient. The reaction may be conducted at atmospheric pressure conditions or under super atmospheric pressure which is sometimes desired, particularly when a low boiling amine reactant is employed. Generally, it is preferred to employ autogenous pressure, that is, that pressure sufficient to retain the volatile reactants in the system.

The amount of amine employed in the instant reaction merely depends on whether it is desired to react all or only some of the hydrogen-silicon bonds in the hydrosilicone starting material. For example, in theory one silicon-hydrogen bond is equivalent to one nitrogen-hydrogen bond. Accordingly the mole amount of amine employed need only contain that amount or number of NH bonds that is at least about stoichiometrically equivalent to the amount or number of SiH bonds desired to be reacted. Of course, amounts that are less or in excess of said stoichiometric equivalent may be used if desired. By way of a general illustration a 1:1 mole ratio of the SiH will result in a product containing no residual SiH although a slight excess of amine reactant is normally employed to insure this; while a mole ratio of NH/SiH of less than 1:1 will result in a product containing both SiN and SiH bonds. Of course it should be understood that while the general procedure is to react a single hydrosilicone polymer with a single organic amine in the presence of a singel platinum catalyst, if desired, mixtures of such hydrosilicone polymers, mixtures of said amine compounds as well as mixtures of said platinum catalysts or any variable combination of these reactants may be employed in the instant process.

Thus, the silicon-nitrogen polymeric products, more commonly referred to as siloxamines, of this invention are also not limited to any particular class or type of siloxamines, but encompass all classes and types of polymers such as linear, branched, cyclic or cross-linked polymers and the like, containing at least one silicon atom directly bonded to an amino radical which is the corresponding derivative of the above defined organic amine reactants. Such siloxamine products are (1) polymers composed essentially of siloxy units having the formula (C)
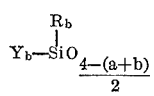

wherein R, $a$ and $b$ are the same as defined above and wherein Y represents a member selected from the group consisting of hydrogen and an amino radical which is the corresponding derivative of the above defined amine reactants, with the proviso that at least one Y is an amino radical, and (2) copolymers containing at least one siloxy unit represented and defined by Formula C above and at least one siloxy unit represented by formula (D)

wherein R and $c$ are the same as defined above. Among the more preferred siloxamine polymer products are those wherein R is a lower alkyl or phenyl radical and Y is an amino radical of the formula—$NR_1R_2$ wherein $R_1$ and $R_2$ are the same as defined above. Accordingly, the siloxamine products may include simple silicone fluids and oils as well as resins, gums, gels and cured siloxane elastomers depending upon the hydrosilicon starting materials. Moreover, it is obvious that physical properties such as molecular weight and viscosity of the siloxamine products will depend on the reactants employed in their process of manufacture.

Illustrative siloxamine products are those polymers which contain at least one siloxy unit, such as (H)(MeHn)SiO, H(EtHN)SiO, (Me)(MeHN)SiO, (Me)(EtHN)SiO, Et(MeHN)SiO, (Et)(EtHN)SiO φ(MeHN)SiO, H(Me$_2$N)SiO, H(Et$_2$N)SiO, Me(Me$_2$N)SiO, Et(Et$_2$N)SiO, φ(Et$_2$N)SiO H(C$_5$H$_{10}$N)SiO, Me(C$_5$H$_{10}$N)SiO, (C$_5$H$_{10}$N)$_2$SiO, tions in order to produce silicone gels, gums and elasto- (MeEtN)$_2$SiO, Me$_2$(MeHN)SiO, Me$_2$(Me$_2$N)SiO, Et(Me$_2$N)$_2$SiO, (Me$_2$N)$_3$SiO, Me(φHN)$_2$SiO and the like, wherein Me represents a methyl radical, wherein Et represents an ethyl radical and wherein φ represents a phenyl radical, and which may also contain one or more organosiloxy units as mentioned above as well as unreacted hydrosiloxy units as mentioned above.

Among the more preferred siloxamine products that may be mentioned are linear polymers having the general formula Me$_3$SiO[MeSiNR$_1$R$_2$O]$_n$[Me$_2$SiO]$_m$SiMe$_3$ where Me is methyl, where $R_1$ and $R_2$ are methyl or ethyl, where $n$ is an integer of from 3 to 100 and where $m$ is an integer of from 12 to 500.

The organosilicon-nitrogen compounds prepared by the process of this invention have uses well known and understood in the art of organosilicon chemistry. For example, they may be per se silicone fluids, oils, resins, gums, gels or cured siloxane elastomers. They are useful alone or in conjunction with other materials to treat paper, textiles, leater, etc.; to impart water-repellancy and help reduce shrinkage characteristics. They can also be used to waterproof metals, glass and ceramics. They can be used as oils, resins or resin forming intermediates, as surfactants, as well as be employed as processing aids for polysiloxane elastomers, such as in the treatment of fillers. They can also be used as additives for lubricants and adhesives or used to assist in binding siliceous fibers to impart dimensionable stability to said fibers. In addition polyfunctional organosilicon-nitrogen compounds are extremely useful as ingredients for room temperature vulcanizable compositions in order to produce silicone gels, gums and elastomers. The products of this invention may be further reacted with a host of other compounds to produce known chemical derivatives having a wide variety of conventional uses. It is apparent the utility in a specific area will depend upon the silicon functionality and organic substituents on the products as well as the nature of the products themselves.

The following examples are illustrative of the present invention and are not to be regarded as limitative. It is to be understood that all parts, percentages and proportions referred to herein and in the appended claims are by weight unless otherwise indicated and Me is methyl and Et is ethyl.

EXAMPLE 1

About 0.2 mole (44.4 grams) of heptamethyltrisiloxane having the formula [Me$_3$SiO]$_2$SiMeH; about 0.3 mole (22 grams of diethylamine and 1.3 grams of a platinum-on-gamma-alumina catalyst containing 2 percent platinum as metal were charged to a 300 cc. stainless steel pressure vessel and heated in a rocking electric furnace at 250° C. for 3 hours. The maximum autogenous pressure at reaction temperature was 750 p.s.i.g. and the pressure at room temperature after the contents were cooled to room temperature at the end of the run was 350 p.s.i.g. The hydrogen was vented off and 63.5 grams of light brown liquid were discharged and distilled through a 30 cm. Vigreux column under reduced pressure to give the desired siloxamine product having the formula

which was obtained in 86% yield. The siloxamine product gave the following physical data:

Boiling point—37° C./0.6 mm. Hg.
Refractive index ($n_D{}^{25}$)—1.4010.

EXAMPLE 2

About 0.25 mole (33.5 grams) of tetramethyldisiloxane having the formula [HSiMe$_2$]$_2$O; about 0.3 mole (22 grams) of diethylamine and 1.4 grams of a platinum-on-gamma-aluminum catalyst containing 2 percent platinum as metal were charged to a 300 cc. stainless steel pressure vessel and heated in a rocking electric furnace at 250° C. for two hours and then cooled to room temperature. The maximum autogenous pressure at 250° C. was 850 p.s.i.g. and the residual pressure at room temperature was 300 p.s.i.g. The hydrogen gas was vented off and the brown liquid reaction product discharged and distilled through a 30 cm. ¼" glass helix packed column under reduced pressure to give the desired siloxamine product having the formula

which was obtained in 82.5% yield. The siloxamine product gave the following physical and analytical data:

Boiling point—52–54° C./10 mm. Hg.
Refractive index ($N_D^{25}$)—1.4058
Hydrolyzable hydrogen:
  Found—109 cc./g.
  Theory—109.4 cc./g.

EXAMPLE 3

About 0.067 mole (15 grams) of heptamethyltrisiloxane having the formula $[Me_3SiO]_2SiMeH$ and about 0.118 mole (10 grams) of piperidine ($C_5H_{10}NH$) were charged to a 100 ml. round bottom flask which was equipped with a short distilling column and condenser. The outlet of the reaction system was attached by rubber tubing to a gas sampling bulb. This bulb was placed in a large beaker filled with water so that the gas could be vented off and the gas evolved could be measured by the volume of water displaced. There was an immediate rapid reaction when a few catalytic pellets consisting of alumina pellets containing 0.5 weight-percent platinum were added and in 6 hours at room temperature, 340 ml. of hydrogen gas were vented off. The continued evolution of hydrogen gas was accelerated by heating to 65° C. until the volume of gas evolved was greater than the sampling bulb. The gas remaining in the sampling bulb was analyzed by mass spectroscopy to contain hydrogen, air and water vapor thus demonstrating the displacement of the silanic hydrogen by the amine radical and hence the formation of the siloxamine product $[Me_3SiO]_2MeSiNC_5H_{10}$.

EXAMPLE 4

A 300 cc. steel pressure vessel was charged with 111 grams of heptamethyltrisiloxane having the formula $[Me_3SiO]_2SiMeH$; 25 grams of anhydrous dimethylamine and 1.43 grams as a 1.36 weight per cent solution of $H_2PtCl_6 \cdot 6H_2O$ in tetrahydrofuran and heated in a rocking electric furnace from 185° to 210° C. until the reaction was completed and then the contents cooled to room temperature. The maximum autogenous pressure at 210° C. was 1900 p.s.i.g. and the residual pressure at room temperature was 950 p.s.i.g. The hydrogen gas was vented off and the liquid reaction product discharged and then distilled to give 97 grams of the desired siloxamine product having the formula

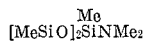

EXAMPLE 5

One hundred grams of a hydrosilicon modified siloxane polymer having the average formula $Me_3SiO[MeSiHO]_{4.5}[Me_2SiO]_{12}SiMe_3$ were charged into a 300 cc. stainless steel pressure vessel. Said polymer was prepared by equilibrating $Me_3SiOSiMe_3$, $[MeHSiO]_5$ and $[Me_2SiO]_4$ and contained 0.335 moles of MeSiHO hydrosiloxy units and had a cryoscopic molecular weight of 1370±137. About 0.35 moles (15.8 grams) of anhydrous dimethylamine were charged into the vessel followed by 200 parts per million of platinum as a one per cent $H_2PtCl_6 \cdot 6H_2O$ solution in tetrahydrofuran. The vessel was heated to 200° C. and this temperature maintained for 2 hours. The reaction mixture was then cooled to room temperature and vacuum stripped to yield 102 grams of siloxamine product having the average formula

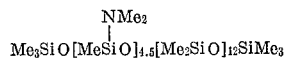

Infrared analysis showed the presence of no silicon bonded hydrogen and titration analysis showed the presence of 13.9+1% of silicon bonded dimethylamine (13.1% theoretical).

Following the above procedure a number of reactions were conducted on various hydrosilicon modified polymers to produce the corresponding siloxamine products of the average formulas

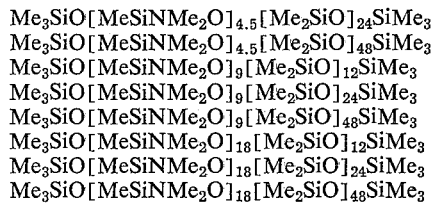

Various modifications and variations of this invention will be obvious to a worker skilled in the art and it is understood that such modifications and variations are to be included within the purview of this application and the spirit and scope of the appended claims.

What is claimed is:

1. A process for preparing a siloxamine polymer containing at least one amino radical directly bonded to silicon which comprises reacting a hydrosilicon modified silicone polymer selected from the group consisting of hydrosiloxanes composed essentially of siloxy units having the formula

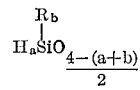

wherein R is a monovalent hydrocarbon radical or a monovalent substituted hydrocarbon radical, said hydrocarbon radicals having from 1 to 18 carbon atoms wherein $a$ is an integer of from 1 to 3 inclusive; wherein $b$ has a value of from 0 to 2 inclusive and wherein the sum of $(a+b)$ is an integer of from 1 to 3 inclusive, and hydrosiloxane copolymers comprising at least one siloxy unit defined by Formula A above and at least one siloxy unit having the formula

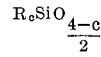

wherein R is the same as defined above and wherein $c$ has a value of from 0 to 3 inclusive; with a primary or secondary amine having the formula

wherein $R_1$ represents a hydrogen atom or a monovalent hydrocarbon radical and wherein $R_2$ represents a monovalent hydrocarbon radical, said hydrocarbon radicals having from 1 to 18 carbon atoms, in the presence of a catalytic amount of a platinum catalyst.

2. A process as defined in claim 1, wherein R is a hydrocarbon radical selected from the group consisting of lower alkyl and phenyl radicals; wherein $a$ is an integer of from 1 to 2 inclusive wherein $b$ is an integer of from 1 to 2 inclusive, and wherein $c$ is an integer from 2 to 3 inclusive.

3. A process as defined in claim 2, wherein $R_1$ and $R_2$ each individually represent lower alkyl radicals.

4. A process as defined in claim 1 wherein the reaction temperature ranges from about room temperature to about 275° C.

5. A process as defined in claim 3 wherein $R_1$ and $R_2$ are methyl radicals.

6. A process as defined in claim 3 wherein $R_1$ and $R_2$ are ethyl radicals.

7. A process as defined in claim 4, which comprises reacting a hydrosiloxane polymer of the general formula

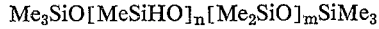

where Me is a methyl radical, where $n$ is an integer of from 3 to 100 and where $m$ is an integer of from 12 to 500 with an amino compound selected from the class consisting of dimethylamine and diethylamine.

(References Cited on following page)

References Cited

UNITED STATES PATENTS

| | | | |
|---|---|---|---|
| 3,249,581 | 5/1966 | Nelson | 260—37 |
| 3,410,886 | 11/1968 | Joy | 260—448.2 |
| 3,419,593 | 12/1968 | Willing | 260—448.2 |
| 3,466,270 | 9/1969 | Cook | 260—88.3 |

DONALD E. CZAJA, Primary Examiner

M. I. MARQUIS, Assistant Examiner

U.S. Cl. X.R

117—124, 125, 135.1, 139.5, 142, 152; 260—37, 448.2